United States Patent
You et al.

(10) Patent No.: US 12,496,949 B2
(45) Date of Patent: Dec. 16, 2025

(54) REAR SEAT FOR VEHICLE

(71) Applicants: Hyundai Motor Company, Seoul (KR); Kia Corporation, Seoul (KR); DAE WON SAN UP CO., LTD, Ansan-si (KR)

(72) Inventors: Jung Sang You, Hwaseong-si (KR); Myung Hoe Kim, Seoul (KR); Dong Woo Jeong, Gwacheon-si (KR); Han Su Yoo, Hwaseong-si (KR); Eun Sue Kim, Hwaseong-si (KR); Dae Hee Lee, Incheon (KR); Jae Kwang Shin, Incheon (KR); Min Ki Jeon, Ansan-si (KR); Hyuk Kim, Ansan-si (KR)

(73) Assignees: HYUNDAI MOTOR COMPANY, Seoul (KR); KIA CORPORATION, Seoul (KR); DAE WON SAN UP CO., LTD, Ansn-si (KR)

( * ) Notice: Subject to any disclaimer, the term of this patent is extended or adjusted under 35 U.S.C. 154(b) by 521 days.

(21) Appl. No.: 18/062,641

(22) Filed: Dec. 7, 2022

(65) Prior Publication Data
US 2024/0025321 A1   Jan. 25, 2024

(30) Foreign Application Priority Data
Jul. 20, 2022   (KR) .................. 10-2022-0089626

(51) Int. Cl.
| | |
|---|---|
| B60N 2/01 | (2006.01) |
| B60N 2/68 | (2006.01) |
| B60N 2/75 | (2018.01) |
| B60N 2/90 | (2018.01) |

(52) U.S. Cl.
CPC ............... *B60N 2/919* (2018.02); *B60N 2/01* (2013.01); *B60N 2/68* (2013.01); *B60N 2/757* (2018.02); *B60N 2002/952* (2018.02)

(58) Field of Classification Search
CPC .......... B60N 2/919; B60N 2/757; B60N 2/01; B60N 2/68; B60N 2002/952
USPC ........................................................... 296/64
See application file for complete search history.

(56) References Cited

U.S. PATENT DOCUMENTS

| | | | | |
|---|---|---|---|---|
| 2,519,963 A | * | 8/1950 | Heffernan .......... | B64D 11/0689 297/313 |
| 3,411,820 A | * | 11/1968 | Brett .................. | B60N 2/01 248/188.1 |
| 5,611,589 A | * | 3/1997 | Fujii .................. | B60N 2/305 296/65.09 |
| 5,951,084 A | * | 9/1999 | Okazaki ............. | B60N 2/793 296/37.16 |
| 6,082,805 A | * | 7/2000 | Gray .................. | B60N 2/34 296/65.09 |

(Continued)

FOREIGN PATENT DOCUMENTS

| | | | | | |
|---|---|---|---|---|---|
| CN | 207396052 U | * | 5/2018 | | |
| DE | 102014118277 A1 | * | 6/2015 | .......... | B60N 2/3056 |

(Continued)

*Primary Examiner* — Hilary L Gutman
(74) *Attorney, Agent, or Firm* — SLATER MATSIL, LLP

(57) ABSTRACT

An embodiment rear seat for a vehicle includes a center seat and side seats located on a left side and a right side of the center seat, respectively, wherein the center seat is configured to be movable forward and rearward with respect to the side seats, and when the center seat is moved forward, the center seat protrudes forward from the side seats.

18 Claims, 20 Drawing Sheets

(56) References Cited

U.S. PATENT DOCUMENTS

| | | | |
|---|---|---|---|
| 6,572,171 B1 * | 6/2003 | Pautz | B60N 2/3065 |
| | | | 296/65.09 |
| 8,833,853 B2 * | 9/2014 | Kim | B60N 2/2362 |
| | | | 297/316 |
| 9,815,388 B1 * | 11/2017 | Lindsay | B60N 2/0248 |
| 12,269,374 B2 * | 4/2025 | You | B60N 2/12 |
| 2007/0158979 A1 * | 7/2007 | Saberan | B60N 2/3065 |
| | | | 297/47 |
| 2009/0072572 A1 * | 3/2009 | Scheinberg | B60N 2/206 |
| | | | 296/64 |
| 2017/0368964 A1 * | 12/2017 | Kim | B60N 2/02246 |
| 2018/0326871 A1 * | 11/2018 | Jackson | B60N 2/0292 |
| 2020/0086769 A1 * | 3/2020 | Aktas | B60N 2/06 |
| 2022/0144142 A1 * | 5/2022 | Kondrad | B60N 2/02 |
| 2023/0415615 A1 * | 12/2023 | You | B60N 2/62 |
| 2024/0025306 A1 * | 1/2024 | You | B60N 2/045 |

FOREIGN PATENT DOCUMENTS

| | | | | |
|---|---|---|---|---|
| FR | 3108277 A1 * | 9/2021 | | B60N 2/3065 |
| FR | 3117420 A1 * | 6/2022 | | B60N 2/01583 |
| JP | 2013163402 A * | 8/2013 | | |
| KR | 0121891 Y1 * | 8/1998 | | |
| KR | 0129274 Y1 * | 12/1998 | | B60N 2/793 |
| KR | 20020090663 A | 12/2002 | | |
| KR | 20090063180 A * | 6/2009 | | B60N 2/01 |

* cited by examiner

REAR SEAT FOR VEHICLE

CROSS-REFERENCE TO RELATED APPLICATIONS

This application claims the benefit of Korean Patent Application No. 10-2022-0089626, filed on Jul. 20, 2022, which application is hereby incorporated herein by reference.

TECHNICAL FIELD

The present invention relates generally to a rear seat for a vehicle.

BACKGROUND

Vehicles are equipped with seats for passengers, and a seat of a vehicle includes a seat cushion supporting the lower body of a passenger, a seat back supporting the upper body, and a headrest supporting the head.

In general, in the case of a passenger vehicle, a rear seat includes triple seats, and each of the triple seats includes seat backs and seat cushions that are integrated so that three passengers can use the rear seat of the vehicle at the same time.

However, in triple rear seats, a passenger on a center seat has a problem in that there is only a small interval between the passenger and left and right passengers, so that it is difficult to sit in a comfortable state due to shoulder bumps between passengers.

The foregoing is intended merely to aid in the understanding of the background of embodiments of the present invention, and is not intended to mean that the present invention falls within the purview of the related art that is already known to those skilled in the art.

SUMMARY

The present invention relates generally to a rear seat for a vehicle. Particular embodiments relate to a rear seat for a vehicle, wherein a center seat among triple rear seats is configured to protrude forward.

Embodiments of the present invention provide a rear seat for a vehicle including a structure in which a center seat among triple rear seats for a vehicle is movable forward, and embodiments of the present invention can induce a comfortable seating condition of rear passengers, such that the center seat moves and protrudes forward when necessary so as to increase an interval between the passengers and to prevent physical contact between the passengers on the center seat and side seats as much as possible.

According to one embodiment of the present invention, there is provided a rear seat for a vehicle, the rear seat including a center seat and side seats located at left and right of the center seat, wherein the center seat may be movable forward and rearward with respect to the side seats, and when the center seat moves forward, the center seat may protrude forward from the side seats.

The center seat may include a center seat back frame and a center seat cushion frame that may be rotatably connected to each other by a first hinge as a medium, and each of the side seats may include a side seat back frame and a side seat cushion frame that may be rotatably connected to each other by a second hinge as a medium.

The center seat may include a center seat back frame and a center seat cushion frame that may be rotatably connected to each other by a first hinge or a second hinge as a medium.

A back wire may be coupled to a center seat back frame of the center seat to protrude rearward, a first vehicle body bracket in which a concave wire groove may be formed may be fixed to a vehicle body facing the back wire, and the center seat back frame may be configured to be rotatable on the back wire inserted in the wire groove.

Cushion pins may be coupled to opposite side portions of a side seat cushion frame of each of the side seats to protrude in opposite directions, second vehicle body brackets may be fixed to a vehicle body facing the cushion pins, and each of the second vehicle body brackets may have a concave pin inserting groove. The pin inserting groove may include a plurality of position locking grooves in which a position of each of the cushion pins inserted in the pin inserting groove may be locked, and the plurality of position locking grooves may be arranged to be longitudinally spaced apart from each other, and when each of the cushion pins moves forward and rearward so as to be inserted into each of the position locking grooves, the side seat cushion frame may move forward and rearward so that an angle of a side seat back frame may be changed.

When the side seat cushion frame moves forward and rearward, the center seat may move together.

The rear seat may include a first link and a second link, which may connect a center seat back frame of the center seat to a side seat back frame of each of the side seats, wherein the first link and the second link may be arranged in parallel to each other, and opposite ends of each of the first and second links may be respectively connected to the center seat back frame and the side seat back frame in a rotatable hinge structure.

A lower end of the second link may be rotatably coupled to the side seat back frame by a hinge as a medium, a locking tooth may be formed on an outer circumferential surface of the lower end of the second link, a locking lever engaged with the locking tooth and a locking cam engaged with the locking lever may be rotatably respectively coupled to the side seat back frame by a lever shaft and a cam shaft as mediums, and the cam shaft may be coupled to a cam bracket, so that the cam bracket, the cam shaft, and the locking cam may rotate integrally.

The rear seat may include a lever bracket fixed to a side seat cushion frame of each of the side seats and an operation lever rotatably coupled to the lever bracket, a lever spring of which opposite ends may be provided to be respectively supported by the lever bracket and the operation lever, and a cable connecting the cam bracket to the operation lever.

The operation lever may be located below a cushion part of the center seat. When the cushion part of the center seat descends, the operation lever is pressed by the cushion part, the cable may be relaxed, the locking tooth, the locking lever, and the locking cam of the second link may maintain locked states, and the center seat back frame may maintain a locked state in which rotation thereof may be impossible with respect to the side seat back frame.

The operation lever may be located below a cushion part of the center seat. When the cushion part of the center seat rotates upward, the operation lever may be released from pressing by the cushion part and may rotate by a spring force of the lever spring, and when the operation lever rotates, the cable may be pulled, the cam bracket, the locking cam, and the locking lever may rotate and thus the locking lever, the second link, and the locking tooth may be released from locking as the cable is pulled, and when the locking is released, the center seat may be longitudinally movable with respect to the side seats.

The center seat may include a center seat back frame and a center seat cushion frame that may be rotatably connected to each other by a first hinge as a medium, and a strap may be coupled to the center seat cushion frame so that a cushion part of the center seat may rotate upward by using the strap.

A center seat cushion frame of the center seat may include a wire clip, and a side seat cushion frame of each of the side seats may include a front wire and a rear wire that are longitudinally spaced apart from each other, the front wire and the rear wire being inserted into the wire clip.

When a cushion part of the center seat rotates upward, the front wire or the rear wire may come out of the wire clip and escape therefrom.

The front wire and the rear wire may be located below the wire clip, and when the front wire is inserted into the wire clip, the center seat may protrude by moving forward with respect to the side seats.

The front wire and the rear wire may be located below the wire clip, and when the rear wire is inserted into the wire clip, the center seat may be prevented from protruding forward with respect to the side seats and arranged on the same line as the side seats.

An arm rest may be rotatably coupled to a back part of the center seat.

As described above, according to embodiments of the present invention, the rear seat for a vehicle seats three passengers by using the center seat and the side seats located at left and right of the center seat, and the center seat is configured to move and protrude forward with respect to the side seats, and when the center seat protrudes forward, a distance between the passengers can increase, so that physical contact between the passenger on the center seat and the passengers on the side seats can be prevented as much as possible, and the comfortable seating condition of the rear passengers can be induced.

DETAILED DESCRIPTION OF ILLUSTRATIVE EMBODIMENTS

Figure 1:
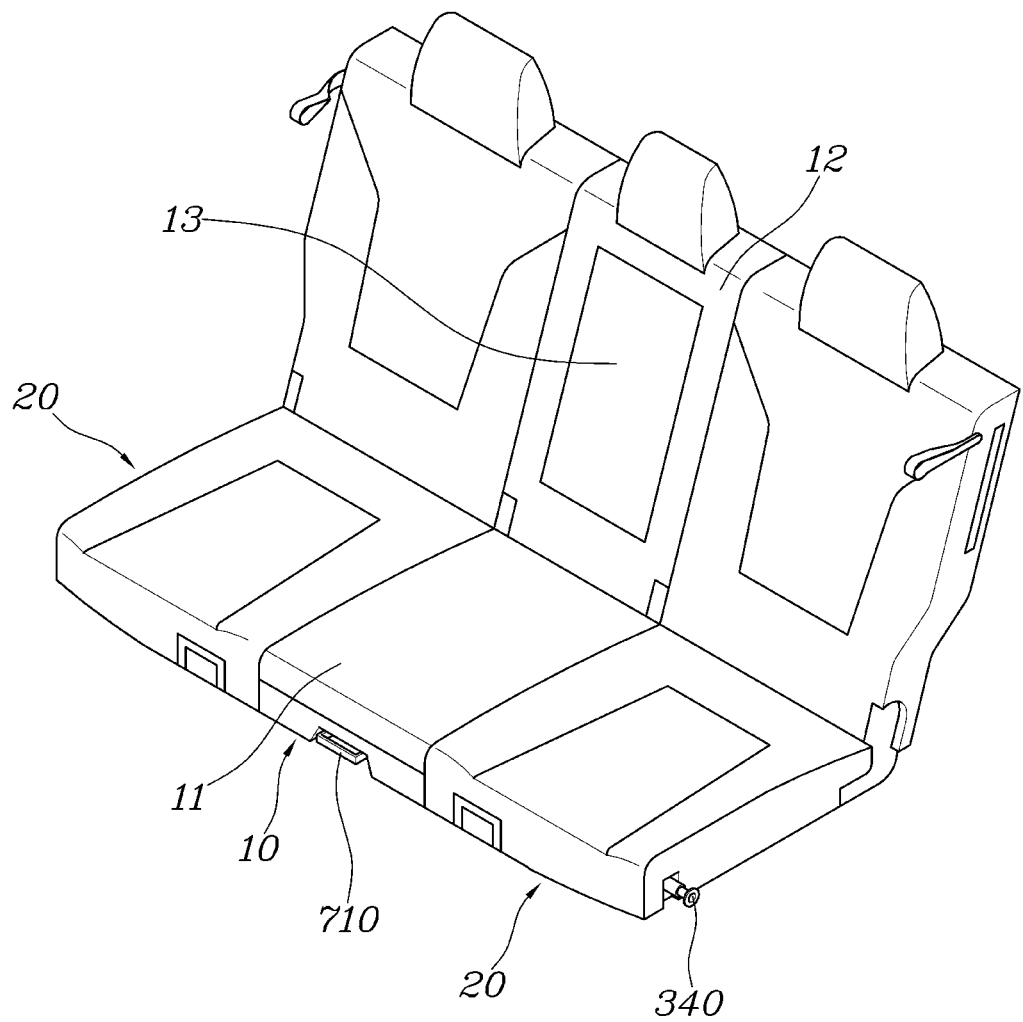
FIG. 1 is a perspective view showing the rear seat for a vehicle according to embodiments of the present invention.

Hereinbelow, a preferred embodiment described in the specification will be described in detail with reference to the accompanying drawings, and regardless of the reference numerals, the same reference numerals will refer to the same or like parts, and redundant descriptions thereof will be omitted.

The suffixes "module" and "part" for the components used in the following description are given or mixed in consideration of only the ease of writing the specification, and do not have distinct meanings or roles by themselves.

In the following description, if it is decided that the detailed description of a known function or configuration related to embodiments of the invention makes the subject matter of the embodiments of the invention unclear, the detailed description is omitted.

Furthermore, the accompanying drawings are only for understanding of the preferred embodiments of the present invention, and the technical ideas disclosed in the specification are not limited by the accompanying drawings, and those skilled in the art will appreciate that various modifications, additions and substitutions are possible, without departing from the scope and spirit of the invention as disclosed in the accompanying claims.

It will be understood that, although the terms first and/or second, etc. may be used herein to describe various elements, these elements should not be limited by these terms. These terms are only used to distinguish one element from another element.

It is to be understood that when one element is referred to as being "connected to" or "coupled to" another element, it may be connected directly to or coupled directly to another element or be connected to or coupled to another element, having the other element intervening therebetween.

On the other hand, it is to be understood that when one element is referred to as being "connected directly to" or "coupled directly to" another element, it may be connected to or coupled to another element without the other element intervening therebetween.

Singular forms are intended to include plural forms unless the context clearly indicates otherwise.

It will be further understood that the terms "comprises" or "have" used in this specification specify the presence of stated features, steps, operations, components, parts, or a combination thereof, but do not preclude the presence or addition of one or more other features, numerals, steps, operations, components, parts, or a combination thereof.

Furthermore, a unit or a control unit included in names such as a motor control unit (MCU), a hybrid control unit (HCU), etc. is only a widely used term for a controller that controls a specific function of a vehicle, and does not mean a generic function unit.

The controller may include a communication device communicating with other controllers or a sensor to control the function in charge, a memory storing an operation system or a logic command and input/output information, and at least one process performing a determination, calculation, and decision necessary for controlling the function in charge.

Hereinbelow, a rear seat for a vehicle according to preferred embodiments of the present invention will be described with reference to the accompanying drawings.

According to embodiments of the present invention, as shown in FIGS. 1 to 20, the rear seat for a vehicle is a triple seat including a center seat 10 and side seats 20 located at left and right of the center seat 10. The center seat 10 is separately provided from the side seats 20 and the center seat 10 is movable forward and rearward with respect to the side seats 20, and when the center seat 10 moves forward, the center seat 10 protrudes forward with respect to the side seats 20.

In other words, the embodiments according to the present invention include rear seats for three occupants configured to allow the center seat 10 among the rear seats to move forward to protrude forward with respect to the side seats 20, and to allow the forward protruding center seat 10 to move rearward to be restored to an initial position. In the forward protruding state of the center seat 10, an interval between occupants may increase, so that it is possible to prevent physical contact between an occupant on the center seat 10 and occupants on the side seats 20 as much as possible, and thus a comfortable seating state of a rear occupant can be induced.

The center seat 10 includes a center seat back frame 110 and a center seat cushion frame 120 as the frame, and the center seat back frame 110 and the center seat cushion frame 120 are rotatably connected to each other by a first hinge 130 as a medium.

Each of the side seats 20 includes a side seat back frame 210 and a side seat cushion frame 220 as the frame, and the side seat back frame 210 and the side seat cushion frame 220 are rotatably connected to each other by a second hinge 230 as a medium.

The center seat back frame 110 is located at an intermediate position between the side seat back frames 210 and the center seat back frame 110 and the side seat back frames 210 are connected to each other by a link structure, which will be described later, and the center seat cushion frame 120 is placed on an intermediate position between the side seat cushion frames 220 and the center seat cushion frame 120 and the side seat cushion frames 220 are connected to each other by a clip and a wire, which will be described later.

Figure 4:
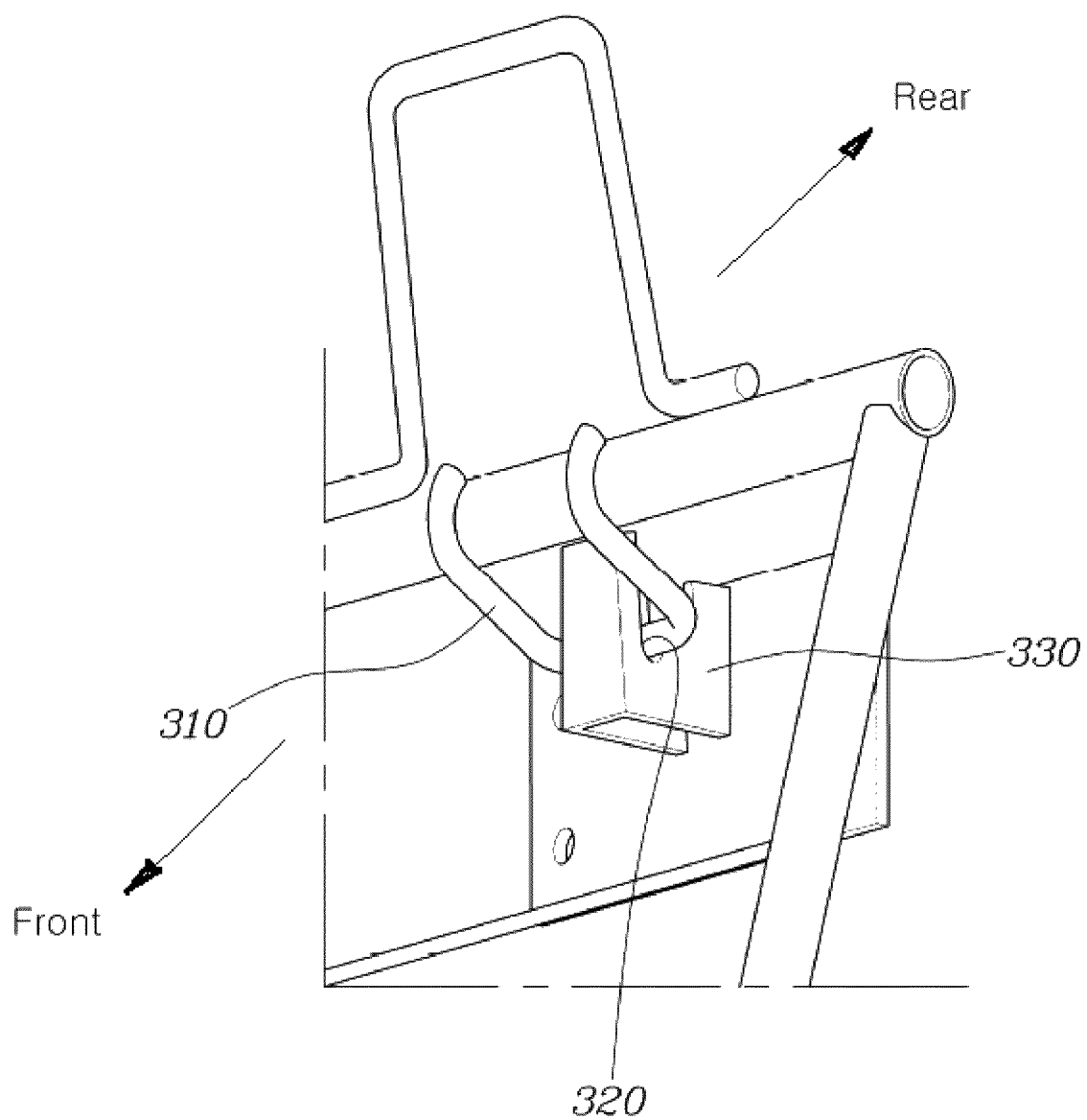
FIGS. 4 and 5 are views showing a coupling structure of a back wire.
Figure 5:
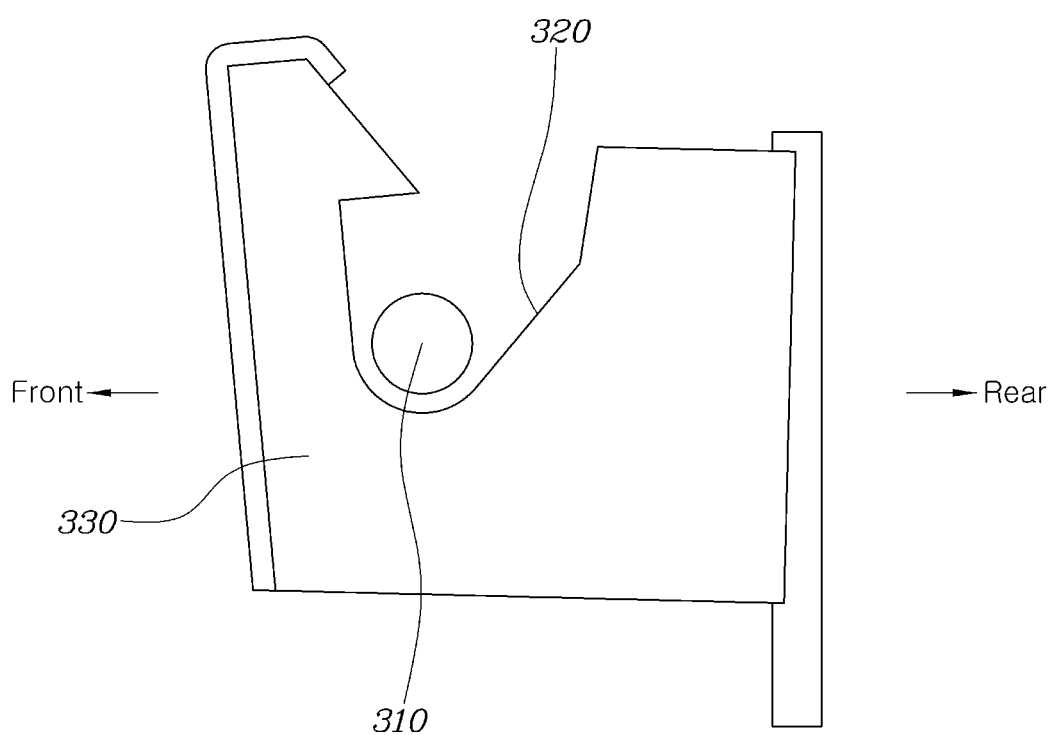

As shown in FIGS. 4 and 5, a back wire 310 is coupled to an upper end of the center seat back frame 110 to protrude rearward, a first vehicle body bracket 330 having a concave wire groove 320 is fixed to a vehicle body facing the back wire 310, and the center seat back frame 110 is installed to be rotatable on the back wire 310 inserted in the wire groove 320.

Figure 6:
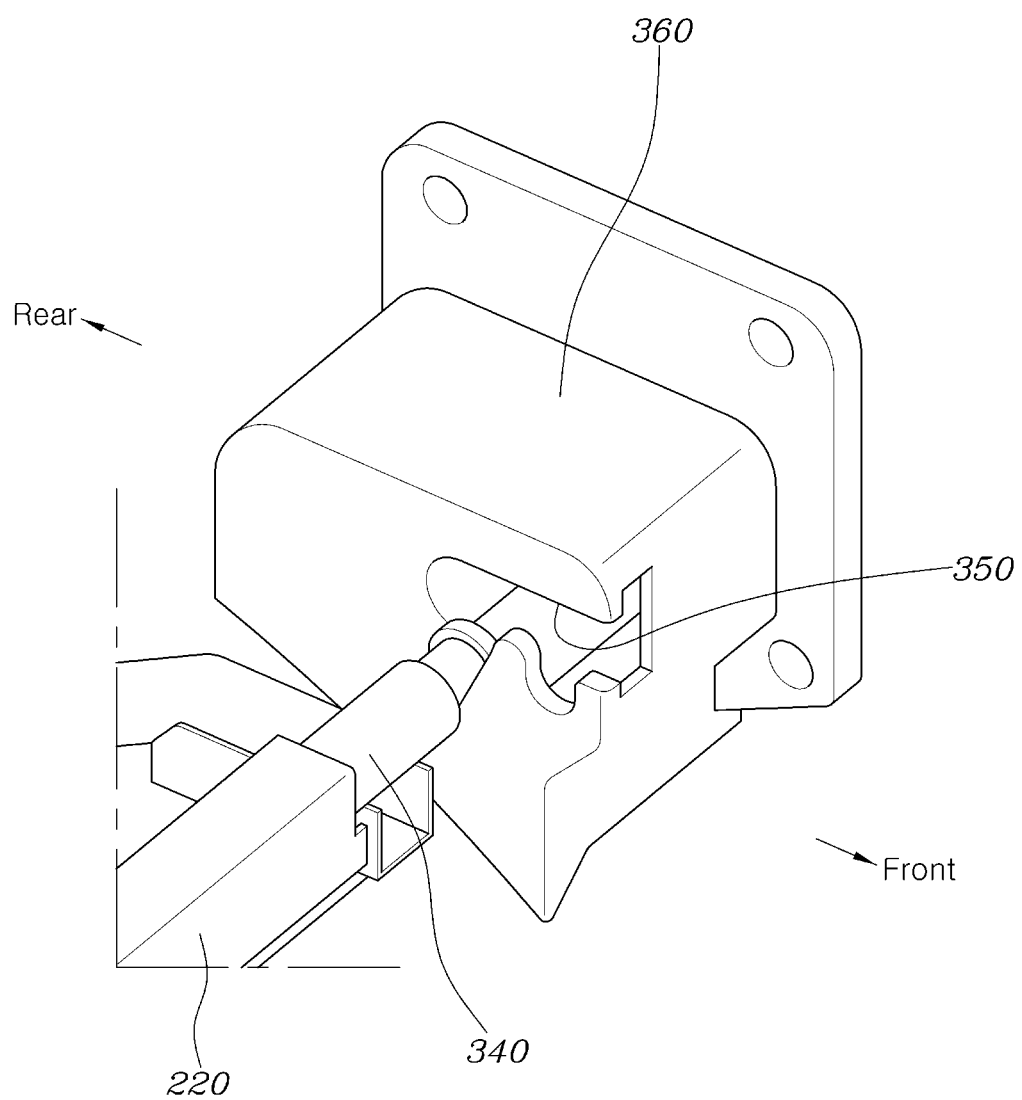
FIGS. 6 and 7 are views showing a coupling structure of a cushion pin.
Figure 7:
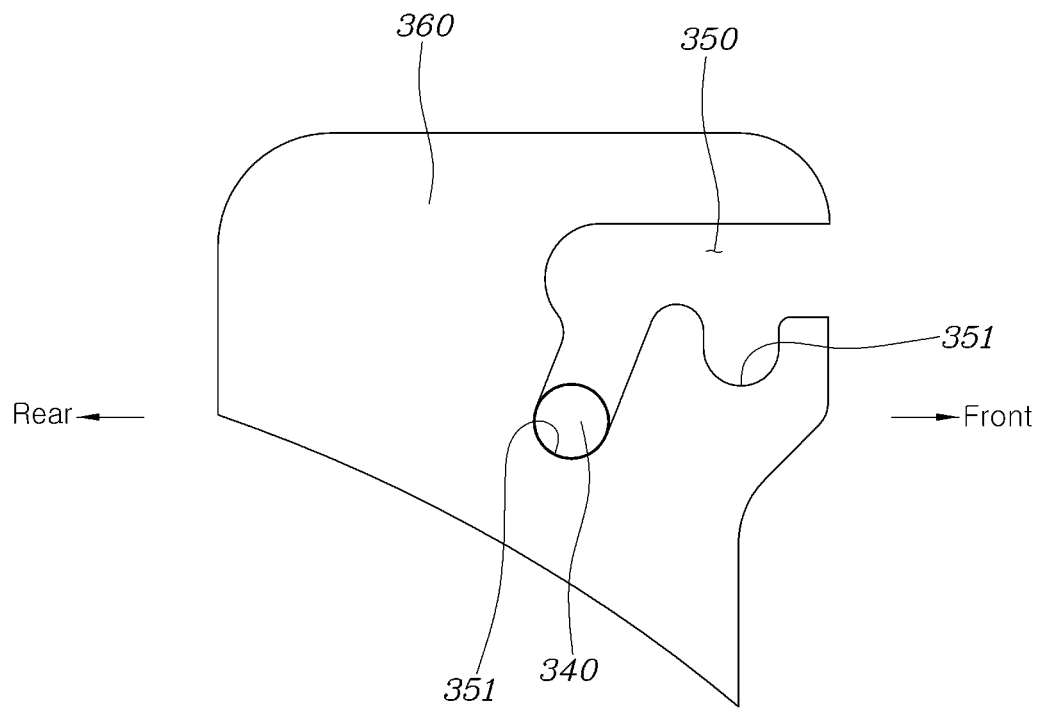
Figure 8:
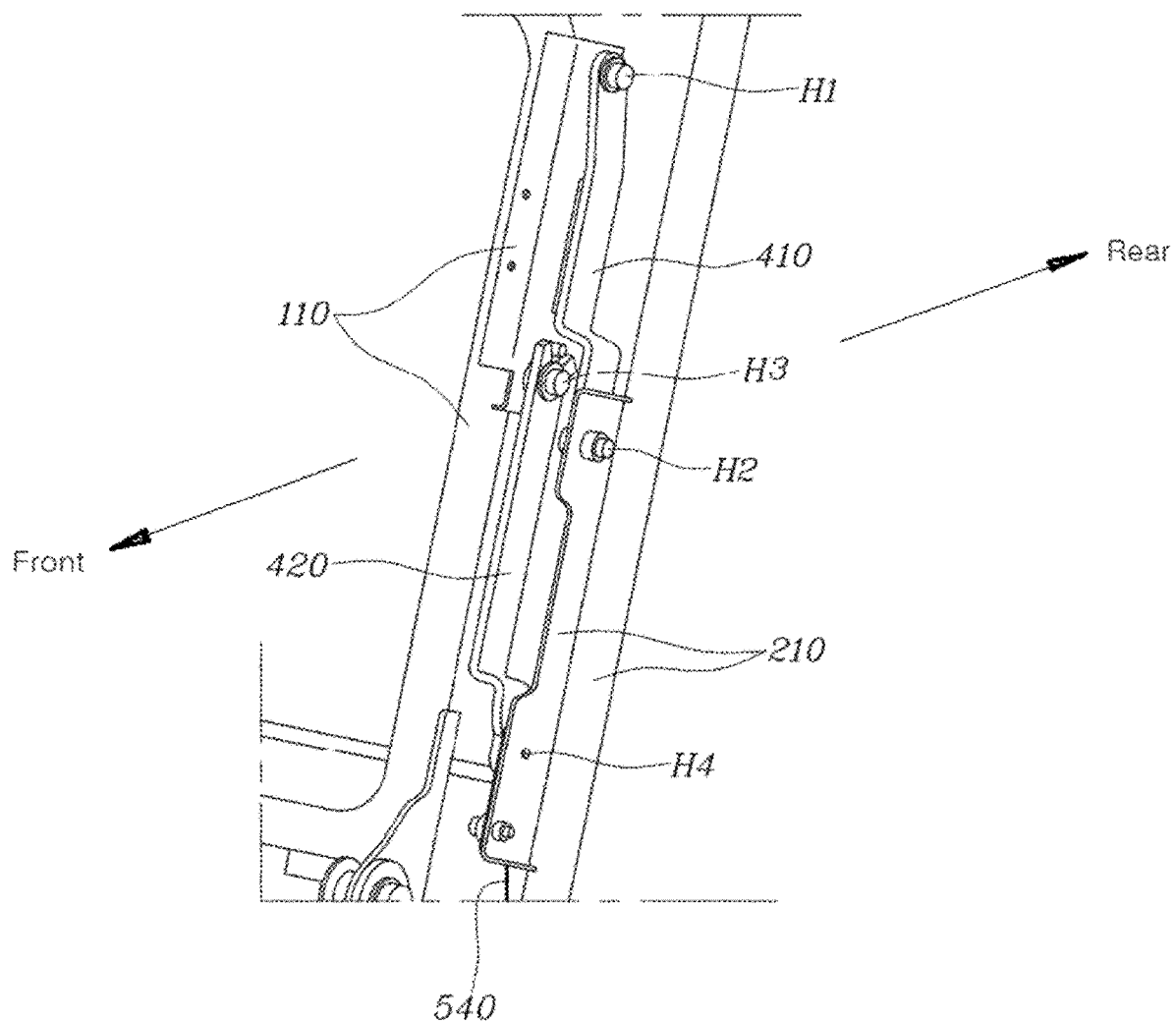
FIG. 8 is a view showing a link structure connecting the center seat back frame to a side seat back frame.

As shown in FIGS. 6 and 7, cushion pins 340 are respectively provided at a left-front portion and a right-front portion of each of the side seat cushion frames 220 to protrude in left and right directions, and a second vehicle body bracket 360 having a concave pin inserting groove 350 is fixed to each portion of the vehicle body facing the cushion pins 340.

A plurality of position locking grooves 351 into which a position of each inserted cushion pin 340 is locked is formed in the pin inserting groove 350, and each of the position locking grooves 351 has a downward concave shape, and two position locking grooves 351 are spaced apart from each other forward and rearward.

When the cushion pin 340 is inserted into and located in a front one of the two position locking grooves 351, the center seat 10 moves forward so that a back angle is changed. When the cushion pin 340 is inserted into and located in a rear one of the two position locking grooves 351, the center seat 10 moves rearward and a back angle is restored into the initial position.

The pin inserting groove 350 formed in the second vehicle body bracket 360 may serve to guide a moving direction when the cushion pin 340 moves forward and rearward.

According to an embodiment of the present invention, when the cushion pin 340 moves forward and rearward so as to be inserted into the position locking grooves 351, the side seat cushion frame 220 moves forward and rearward and thus an angle of the side seat back frame 210 is changed, and as the cushion pin 340 moves forward and rearward along the pin inserting groove 350, when the side seat cushion frame 220 moves forward and rearward, the center seat 10 moves together with the side seat cushion frame 220.

For forward and rearward movements of the center seat 10, an embodiment of the present invention includes a first link 410 and a second link 420 by which the center seat back frame 110 and the side seat back frame 210 are connected to each other.

The first link 410 and the second link 420 are respectively arranged on each of opposite side surfaces of the center seat back frame 110 and are connected to the side seat back frame 210.

The first link 410 and the second link 420 are arranged in parallel to each other, and opposite ends of each of the first link 410 and the second link 420 are respectively coupled to the center seat back frame 110 and the side seat back frame 210 in a rotatable hinge structure H1 to H4.

The center seat back frame 110 and the side seat back frame 210 and the first link 410 and the second link 420 have a 4-joint link structure.

When the center seat 10 moves forward and rearward, the side seat back frame 210 of the 4-joint link structure serves as a fixed part that is not changed in position, and each of the first link 410 and the second link 420 serves as a link that rotates on a hinge H2, H4 at a lower end coupled to the side seat back frame 210, and the center seat back frame 110 serves as a moving part moving forward and rearward when the first and second links 410 and 420 rotate.

A lower end of the second link 420 is rotatably coupled to the side seat back frame 210 by a hinge H4 as a medium.

A locking tooth 510 is formed on an outer circumferential surface of the lower end of the second link 420, and at the lower side of the locking tooth 510, a locking lever 520 engaged with the locking tooth 510 is rotatably coupled to the side seat back frame 210 by a lever shaft 521 as a medium, and at the lower side of the locking lever 520, a locking cam 530 engaged with the locking lever 520 is rotatably coupled to the side seat back frame 210 by a cam shaft 531 as a medium.

A cam bracket 540 is coupled to the cam shaft 531 so that the cam bracket 540, the cam shaft 531, and the locking cam 530 integrally rotate.

Furthermore, the cam shaft 531 is coupled to a return spring.

The return spring of the cam shaft 531 accumulates elastic force while being tensioned by an external force when the locking cam 530 rotates so as to be released from locking with the locking lever 520. When the external force is removed from the locking cam 530, the return spring is restored and the locking cam 530 rotates by the accumulated elastic force, so that locking between the locking cam 530 and the locking lever 520 is induced.

A lever bracket 610 is fixed to the side seat cushion frame 220, and the lever bracket 610 is located below a cushion part 11 of the center seat 10. An operation lever 620 is rotatably coupled to the lever bracket 610 by a lever pin 621, a lever spring 630 is provided around the lever pin 621, opposite ends of the lever spring 630 are supported by the lever bracket 610 and the operation lever 620, and a cable 640 is installed to connect the cam bracket 540 to the operation lever 620.

The lever spring 630 supplies an elastic force to the operation lever 620 so that the operation lever 620 rotates toward the cushion part 11 of the center seat 10.

Figure 9:
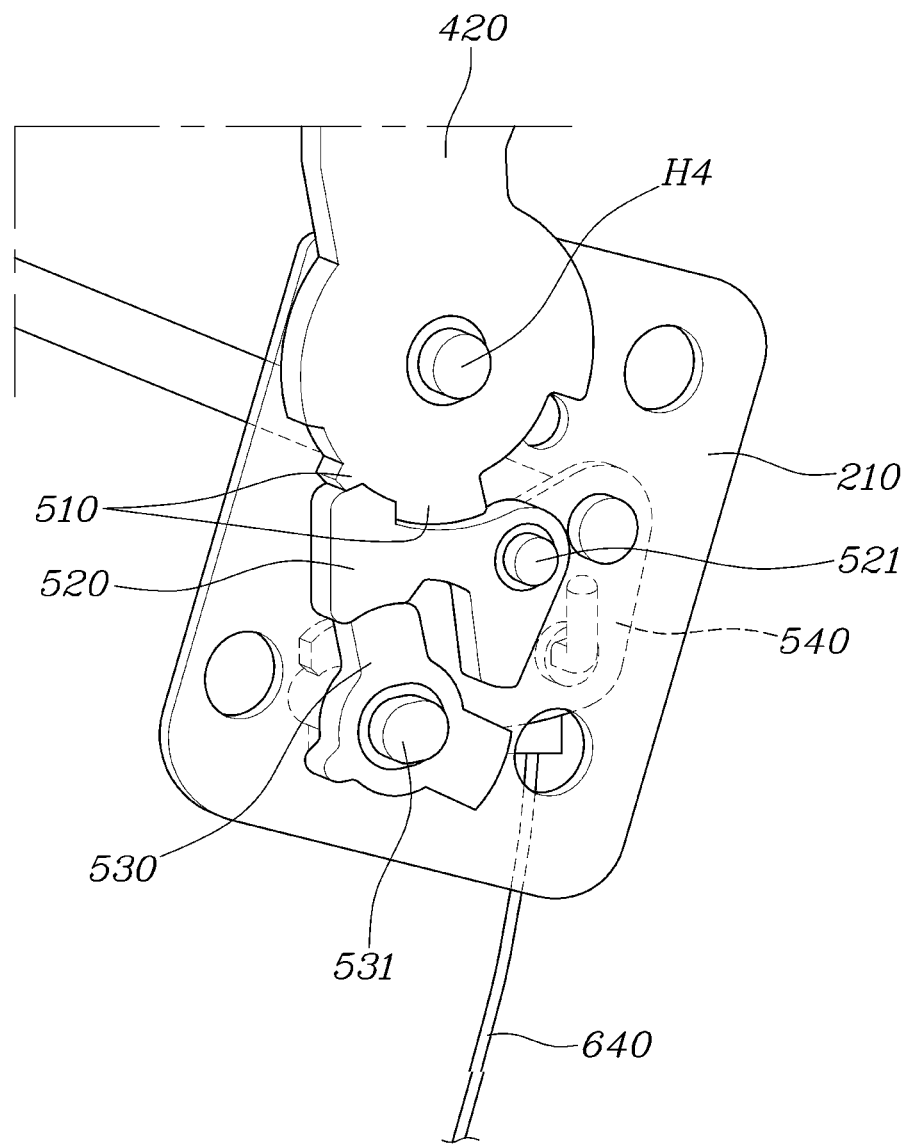
FIG. 9 is a view showing a locking structure of a second link according to embodiments of the present invention.
Figure 10:
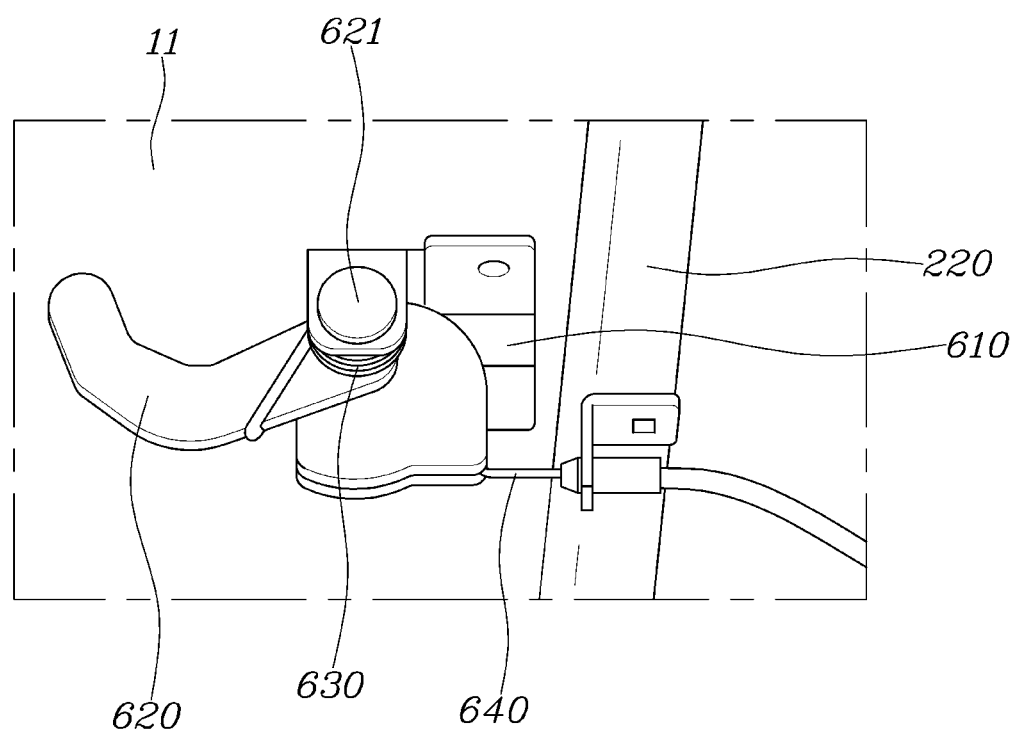
FIG. 10 is a view showing an operation lever of embodiments of the present invention.
Figure 11:
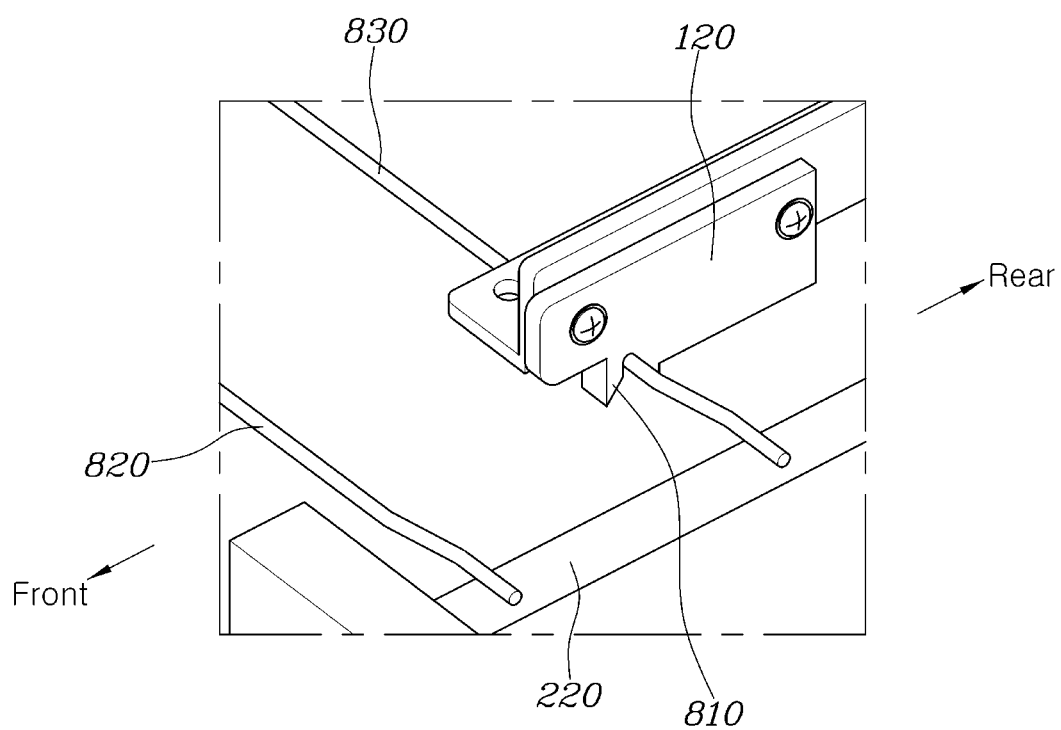
FIGS. 11 and 12 are views showing a wire clip, and a front wire and a rear wire.

The operation lever 620 is located below the cushion part 11 of the center seat 10. When the cushion part 11 of the center seat 10 is lowered, the operation lever 620 is pressed by the cushion part 11, the cable 640 is relaxed, the locking tooth 510 of the second link 420, the locking lever 520, and the locking cam 530 maintain locked states as shown in FIG. 9, and the center seat back frame 110 maintains a locked state in which rotation with respect to the side seat back frame 210 is impossible.

Herein, when the center seat 10 moves forward to protrude or moves rearward to be restored to the initial position, the center seat 10 maintains a state in which movement thereof is impossible by locking of the locking tooth 510, the locking lever 520, and the locking cam 530.

Figure 13:
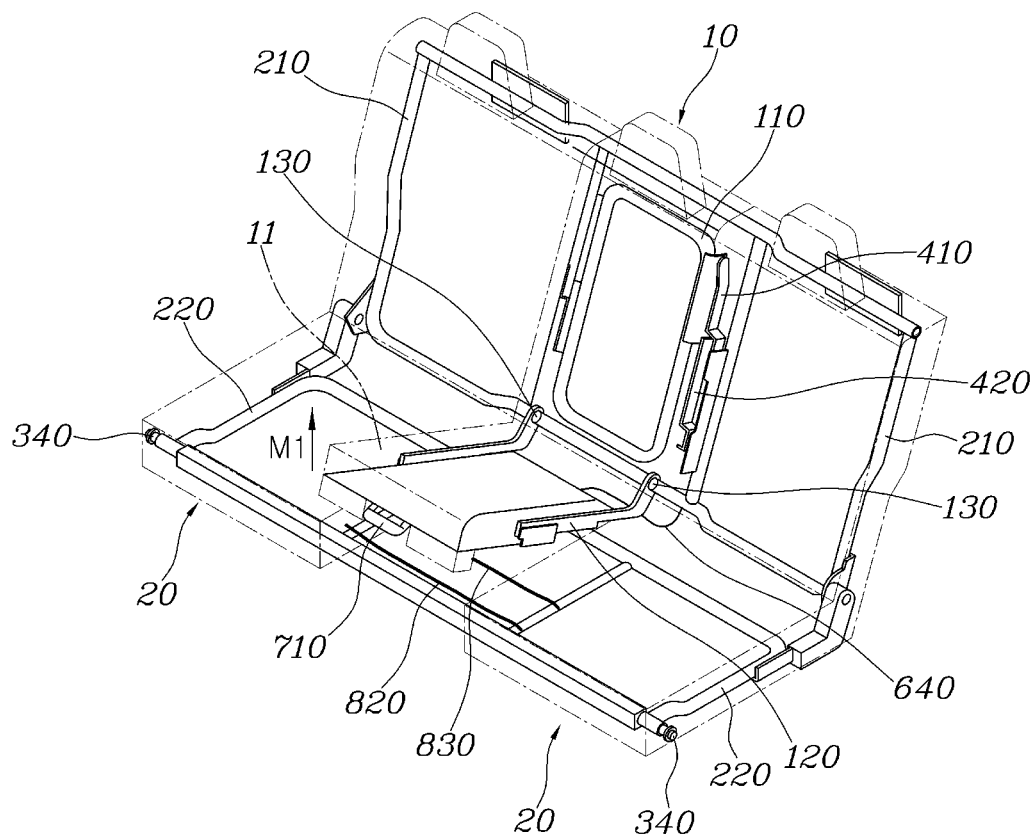
FIGS. 13 to 19 are views showing an operation in which a center seat moves forward and protrudes according to embodiments of the present invention.
Figure 15:
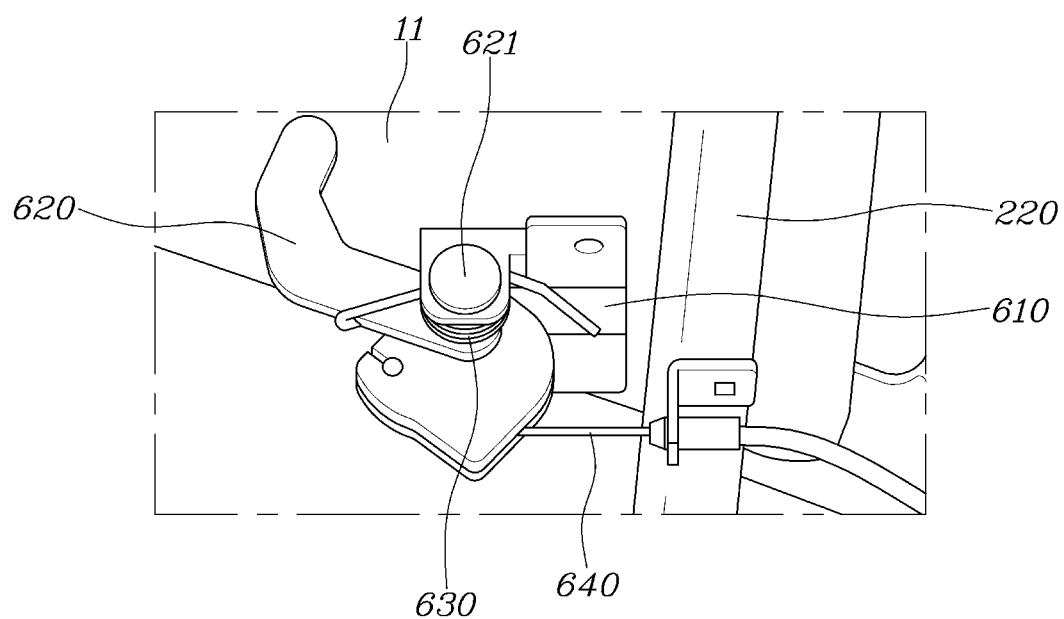
Figure 16:
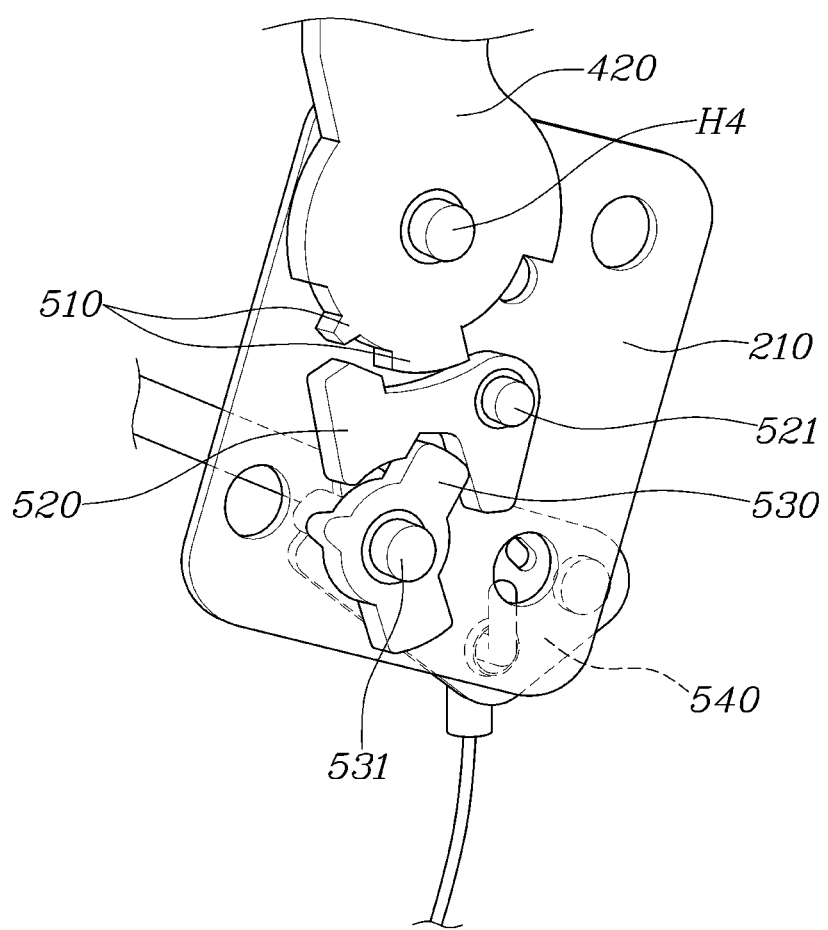

As shown in FIG. 13, when the cushion part 11 of the center seat 10 rotates upward, the operation lever 620 rotates upward toward the cushion part 11 by the spring force of the lever spring 630, as shown in FIG. 15, while being released from pressing by the cushion part 11. When the operation lever 620 rotates, the cable 640 is pulled, and the cam bracket 540, the locking cam 530, and the locking lever 520 rotate by pulling the cable 640, so that the locking lever 520 and the locking tooth 510 of the second link 420 are released from locking as shown in FIG. 16. When the locking is removed, the first and second links 410 and 420 are rotatable and the center seat 10 is longitudinally movable with respect to the side seats 20.

A strap 710 is coupled to a front portion of the center seat cushion frame 120 so that the center seat cushion frame 120 protrudes, and a user grabs the strap 710 and lifts up the cushion part 11 of the center seat 10 as shown in arrow M1 in FIG. 13 to rotate the cushion part 11.

According to embodiments of the present invention, the center seat cushion frame 120 includes a wire clip 810, and the side seat cushion frame 220 includes a front wire 820 and a rear wire 830 arranged back and forth to be spaced apart from each other and inserted into the wire clip 810.

The front wire 820 and the rear wire 830 are located below the wire clip 810 provided at the center seat cushion frame 120 and are longitudinally spaced apart from each other, each of the wires is transversally extended, and opposite ends of each of the wires are securely coupled to the side seat cushion frame 220.

When the user grabs the strap 710 and lifts and rotates the cushion part 11 of the center seat 10, the front wire 820 or the rear wire 830 is separated from the wire clip 810.

Furthermore, when the cushion part 11 of the center seat 10 rotates upward, the cable 640 is pulled by rotation of the locking lever 520 as described above, so that the cam bracket 540, the locking cam 530, and the locking lever 520 rotate to be released from locking, and when releasing locking, the first and second links 410 and 420 are rotatable, and the center seat 10 is longitudinally movable with respect to the side seats 20.

Figure 2:
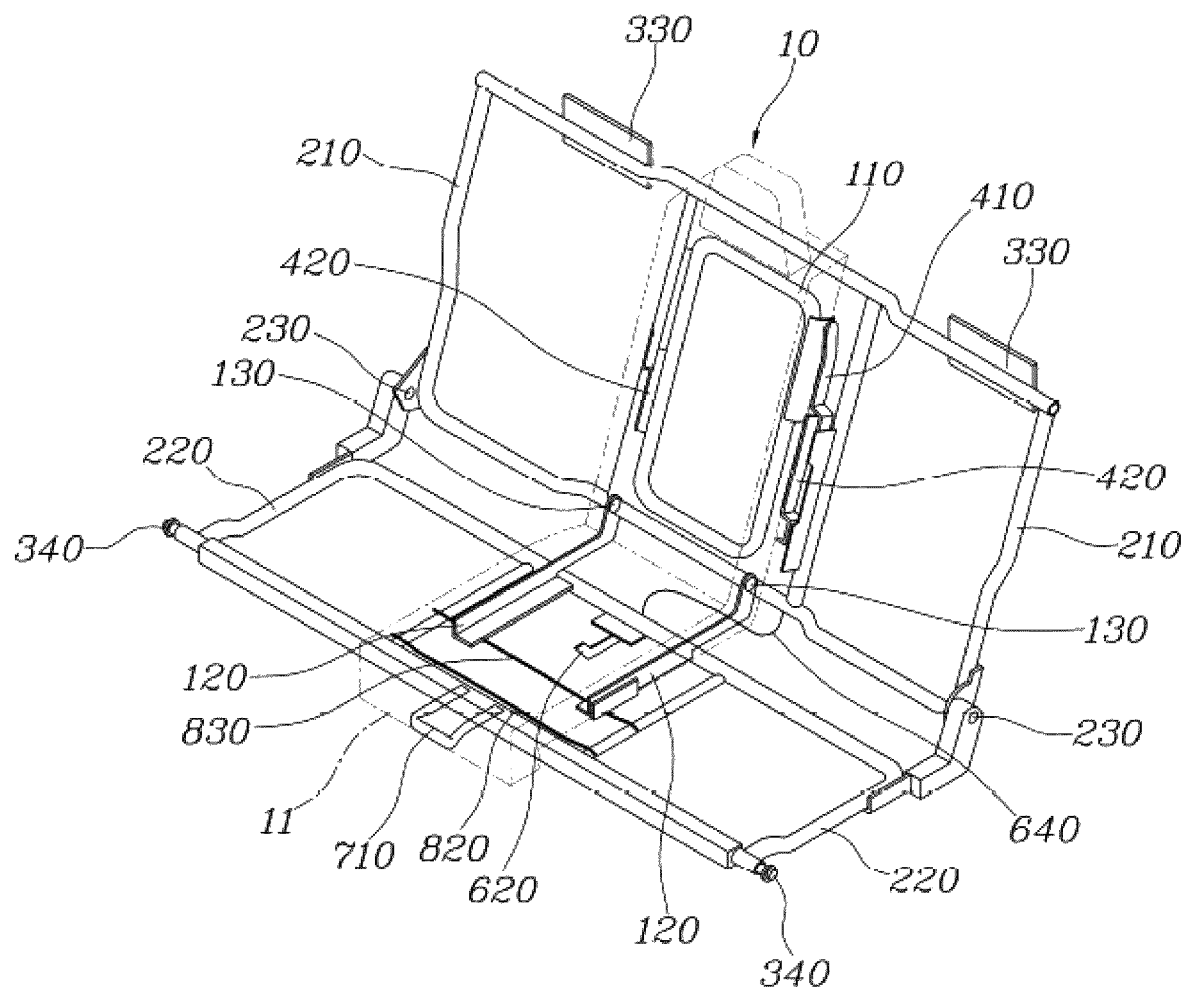
FIG. 2 is a view showing a frame structure in FIG. 1.
Figure 3:
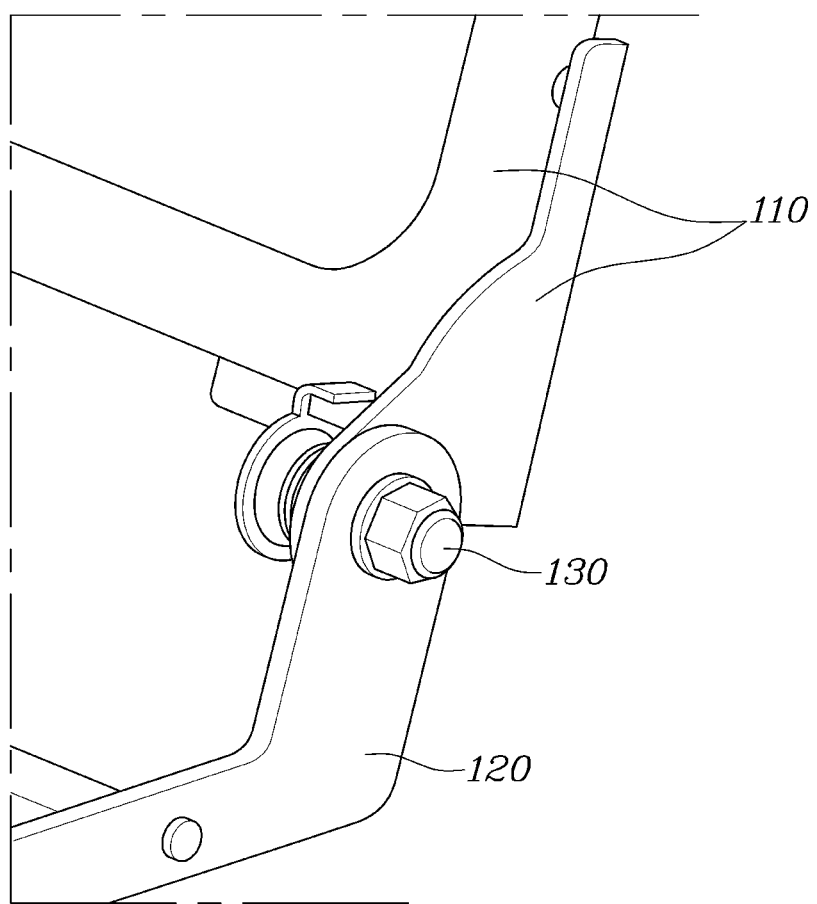
FIG. 3 is a view showing a connection part of a center seat back frame and a center seat cushion frame in FIG. 2.
Figure 12:
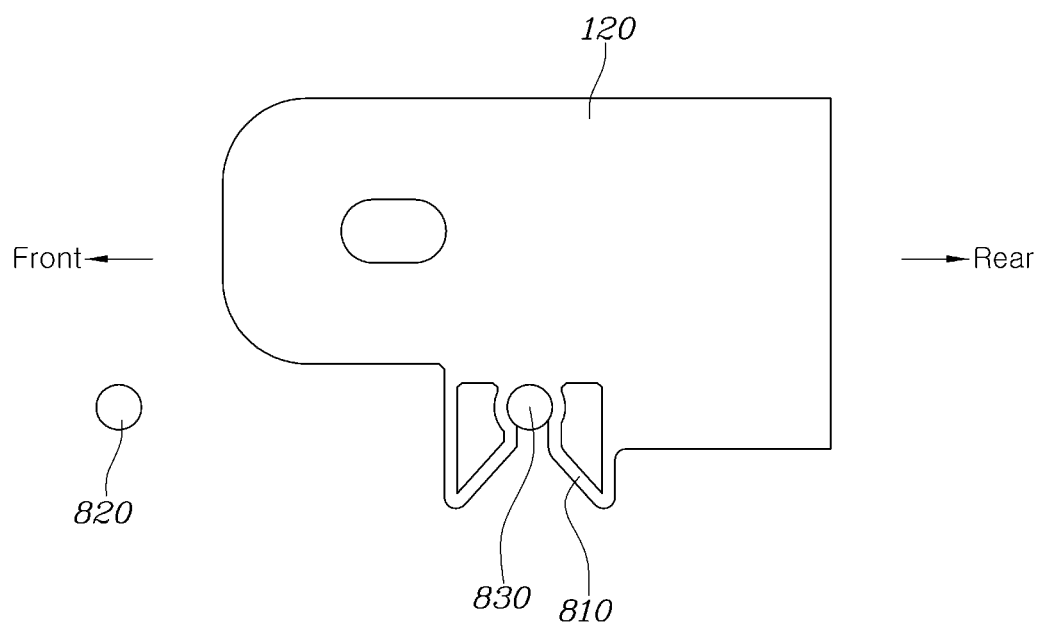

FIGS. 1 and 2 are views showing the center seat 10 that does not protrude with respect to the side seats 20 and is arranged on the same line as the side seats 20. At this point, the rear wire 830 is inserted into and locked by the wire clip 810 of the center seat cushion frame 120, as shown in FIG. 12.

Figure 14:
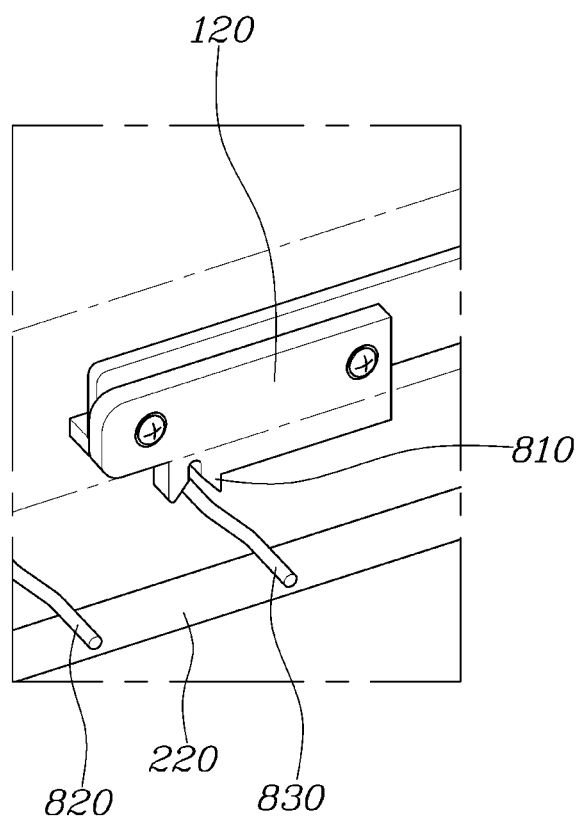

As shown in FIG. 13, when the user grabs the strap 710 and lifts the cushion part 11 of the center seat 10 along arrow M1, the rear wire 830 is separated from the wire clip 810 and deviates as shown in FIG. 14 and, simultaneously, the cable 640 is pulled by rotation of the locking lever 520 as shown in FIG. 15, so that the cam bracket 540, the locking cam 530, and the locking lever 520 rotate to be released from locking as shown in FIG. 16, and in releasing locking, the first and second links 410 and 420 are rotatable and the center seat 10 is longitudinally movable with respect to the side seats 20.

Figure 17:
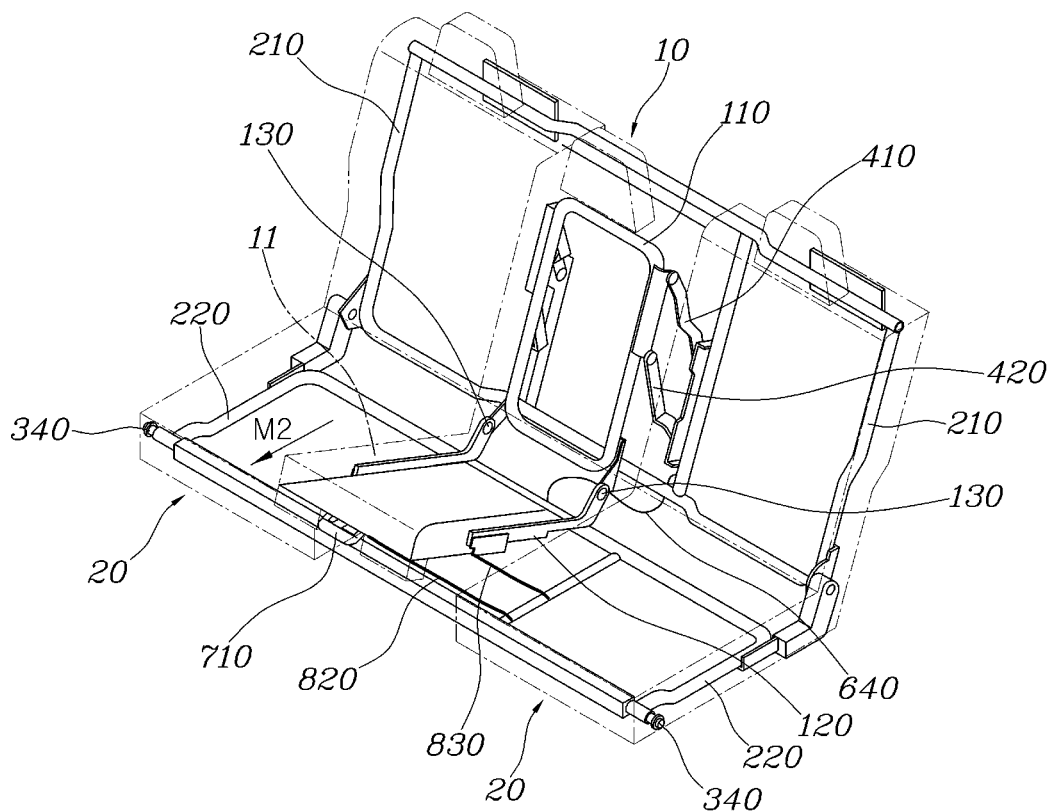

In releasing locking, when the user grabs the strap 710 and pulls forward the cushion part 11 of the center seat 10 in a direction of arrow M2 as shown in FIG. 17, the center seat 10 moves forward by rotations of the first and second links 410 and 420 and protrudes forward more than the side seats 20.

When forward movement of the center seat 10 is completed, the wire clip 810 of the center seat cushion frame 120 is located above the front wire 820.

Figure 18:
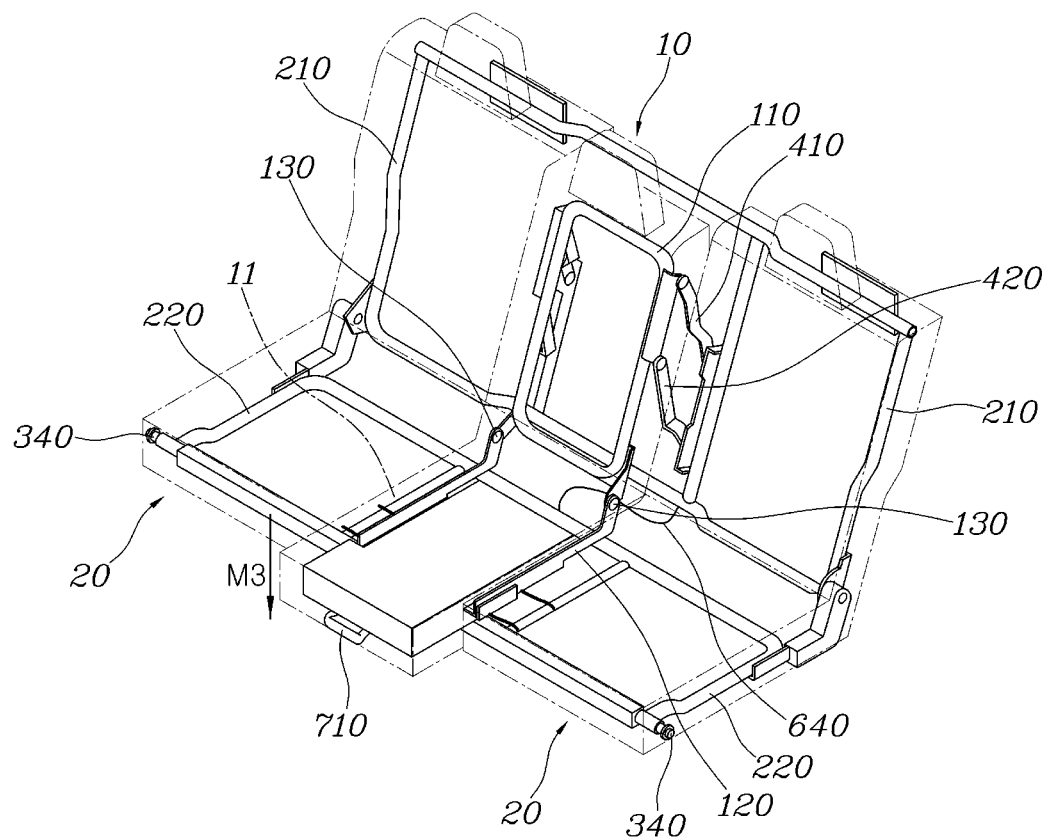
Figure 19:
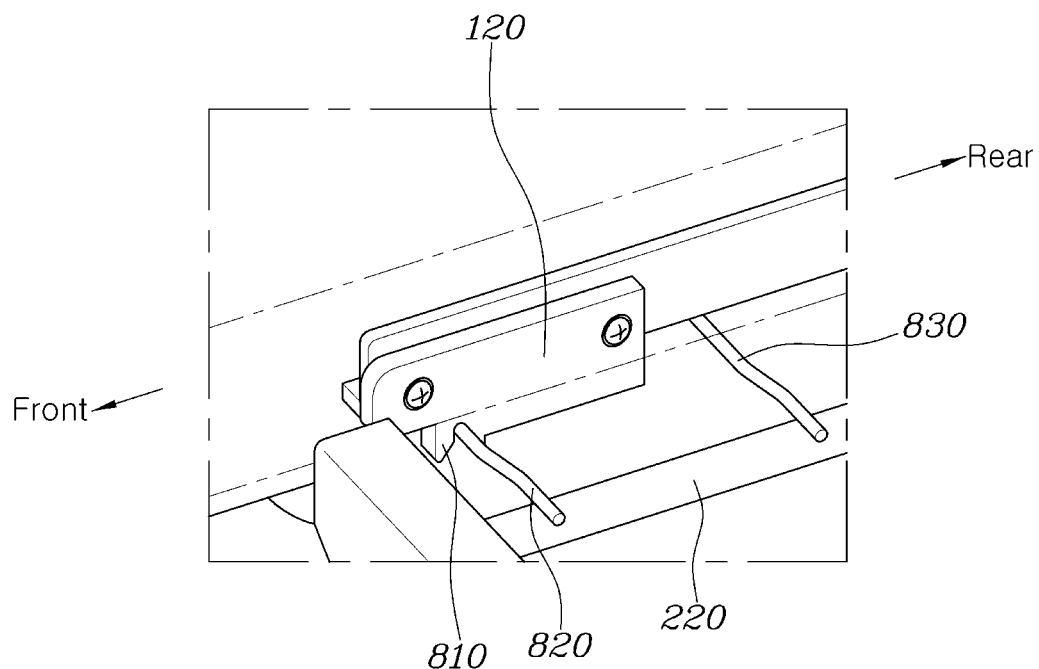
Figure 20:
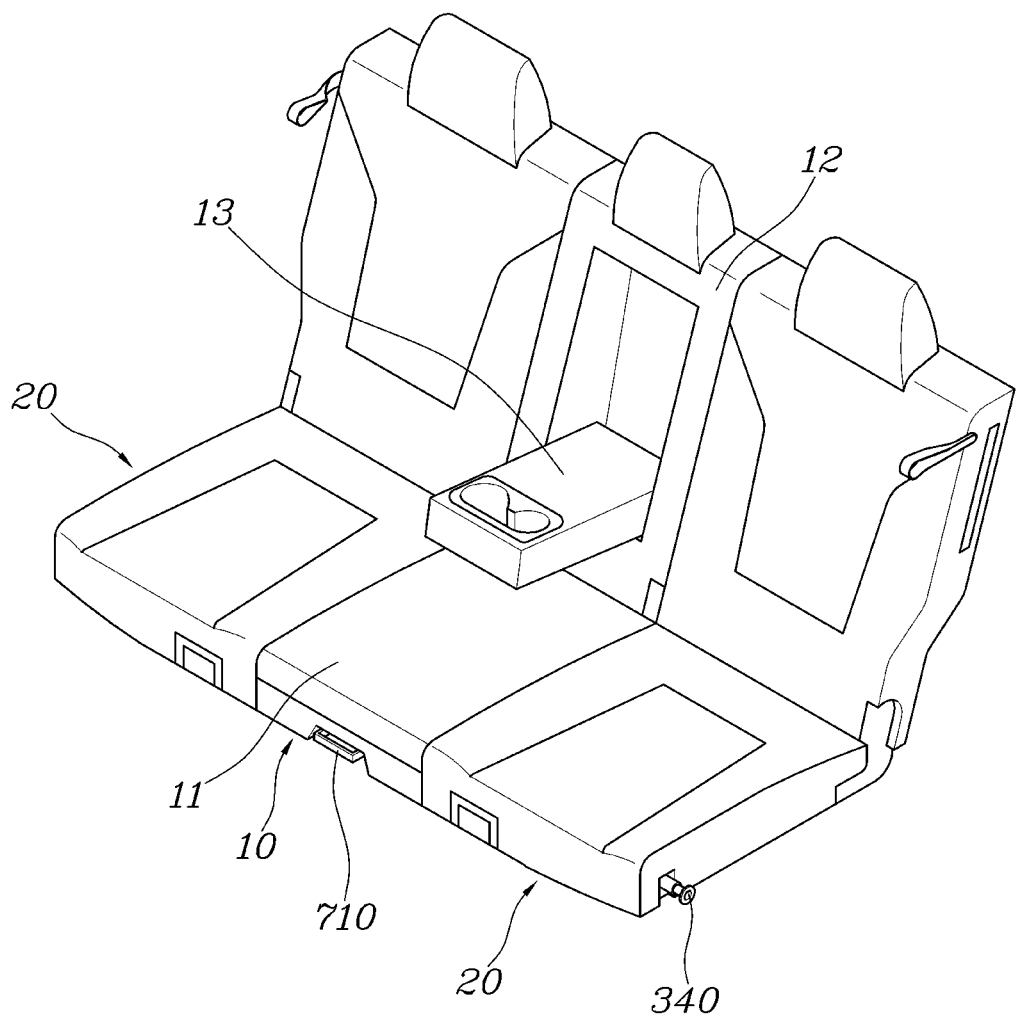
FIG. 20 is a view showing an arm rest provided in a back part of the center seat rotated forward according to embodiments of the present invention.

In a state in which the cushion part 11 of the center seat 10 moves forward and protrudes, in a direction of arrow M3 in FIG. 18, when the user presses downward and rotates the cushion part 11 of the center seat 10, the front wire 820 is inserted into and locked by the wire clip 810 of the center seat cushion frame 120 as shown in FIG. 19.

An operation in which the center seat 10 moving forward and protruding moves rearward again to be restored into the initial position can be performed by performing the above-described operation in reverse order, and the description thereof will be omitted.

The rear seat according to the embodiments of the present invention includes the structure in which an arm rest 13 is rotatably coupled to a back part 12 of the center seat 10, and passengers on the side seats 20 can have comfortable ride quality by using the arm rest 13 of the center seat 10.

As described above, according to embodiments of the present invention, the rear seat for a vehicle seats three passengers by using the center seat 10 and the side seats 20 located at left and right of the center seat 10, and the center seat 10 is configured to move forward with respect to the side seats 20 to protrude, and when the center seat 10 protrudes forward, a distance between the passengers can increase, so that physical contact between the passenger on the center seat 10 and the passengers on the side seats 20 can be prevented as much as possible, so that the comfortable seating condition of the rear passengers can be induced.

Although the preferred embodiments of the present invention have been disclosed in detail only with respect to the above specific embodiments, those skilled in the art will appreciate that various modifications, additions, and substitutions are possible, without departing from the spirit and scope of the present invention, and it is appropriate that the various modifications, additions, and substitutions belong to the accompanying claims.

What is claimed is:

1. A rear seat for a vehicle, the rear seat comprising:
  a left side seat;
  a right side seat; and
  a center seat located between the left side seat and the right side seat,
  wherein:
    the center seat is configured to be movable forward and rearward with respect to the left side seat and the right side seat so that when the center seat is moved forward, the center seat protrudes forward from the left side seat and the right side seat,
    a back wire is coupled to a center seat back frame of the center seat to protrude rearward,
    a first vehicle body bracket having a concave wire groove is fixed to a vehicle body facing the back wire, and
    the center seat back frame is configured to be rotatable on the back wire inserted in the concave wire groove.

2. The rear seat of claim 1, wherein:
  the center seat comprises the center seat back frame and a center seat cushion frame that are rotatably connected to each other by a first hinge, and each of the left side seat and the right side seat comprises
  a side seat back frame and a side seat cushion frame
  that are rotatably connected to each other by a second
  hinge.

3. The rear seat of claim 1, wherein the center seat comprises the center seat back frame and a center seat cushion frame that are rotatably connected to each other by a first hinge or a second hinge.

4. The rear seat of claim 1, further comprising:
  cushion pins coupled to opposite side portions of a side seat cushion frame of each of the left side seat and the right side seat to protrude in opposite directions; and
  second vehicle body brackets to be fixed to a vehicle body facing the cushion pins, each of the second vehicle body brackets having a concave pin inserting groove,
  wherein:
    each of the concave pin inserting grooves comprises a plurality of position locking grooves in which a position of each of the cushion pins inserted in the concave pin inserting groove is locked,
    the plurality of position locking grooves is arranged to be longitudinally spaced apart from each other, and
    when each of the cushion pins moves forward and rearward so as to be inserted into each of the plurality of position locking grooves, the side seat cushion frame can move forward and rearward so that an angle of a side seat back frame is changed.

5. The rear seat of claim 4, wherein, when the side seat cushion frame moves forward and rearward, the center seat is configured to move together with the side seat cushion frame.

6. The rear seat of claim 1, wherein:
  the center seat comprises the center seat back frame and a center seat cushion frame that are rotatably connected to each other by a first hinge, and
  a strap is coupled to the center seat cushion frame so that a cushion part of the center seat is configured to rotate upward by using the strap.

7. The rear seat of claim 1, wherein:
  a center seat cushion frame of the center seat comprises a wire clip, and
  a side seat cushion frame of each of the left side seat and the right side seat comprises a front wire and a rear wire that are longitudinally spaced apart from each other, the front wire and the rear wire being inserted into the wire clip.

8. The rear seat of claim 7, wherein, when a cushion part of the center seat rotates upward, the front wire or the rear wire is configured to come out of the wire clip and escape therefrom.

9. The rear seat of claim 7, wherein:
  the front wire and the rear wire are located below the wire clip, and
  when the front wire is inserted into the wire clip, the center seat is configured to protrude by moving forward with respect to the left side seat and the right side seat.

10. The rear seat of claim 7, wherein:
  the front wire and the rear wire are located below the wire clip, and
  when the rear wire is inserted into the wire clip, the center seat is prevented from protruding forward with respect to the left side seat and the right side seat and is arranged on a same line as the left side seat and the right side seat.

11. The rear seat of claim 1, wherein an arm rest is rotatably coupled to a back part of the center seat.

12. A rear seat for a vehicle, the rear seat comprising:
  a center seat comprising a center seat back frame;
  side seats located on a left side and a right side of the center seat, respectively, each of the side seats comprising a side seat back frame; and
  a first link and a second link connecting the center seat back frame of the center seat to the side seat back frame of each of the side seats,
  wherein:
    the center seat is configured to be movable forward and rearward with respect to the side seats,
    when the center seat is moved forward, the center seat protrudes forward from the side seats,
    the first link and the second link are arranged in parallel to each other and opposite ends of each of the first link and the second link are respectively connected to the center seat back frame and the side seat back frame in a rotatable hinge structure,
    a lower end of the second link is rotatably coupled to the side seat back frame by a hinge;
    a locking tooth is formed on an outer circumferential surface of the lower end of the second link;
    a locking lever engaged with the locking tooth and a locking cam engaged with the locking lever are rotatably respectively coupled to the side seat back frame by a lever shaft and a cam shaft; and
    the cam shaft is coupled to a cam bracket, so that the cam bracket, the cam shaft, and the locking cam are rotatable integrally.

13. The rear seat of claim 12, further comprising:
  a lever bracket fixed to a side seat cushion frame of each of the side seats;
  an operation lever rotatably coupled to the lever bracket;
  a lever spring of which opposite ends are respectively supported by the lever bracket and the operation lever; and
  a cable connecting the cam bracket to the operation lever.

14. The rear seat of claim 13, wherein:
  the operation lever is located below a cushion part of the center seat, and
  when the cushion part of the center seat descends:
    the operation lever is configured to be pressed by the cushion part,
    the cable is configured to be relaxed,
    the locking tooth, the locking lever, and the locking cam of the second link are configured to maintain locked states, and
    the center seat back frame is configured to maintain a locked state in which rotation thereof is prevented with respect to the side seat back frame.

15. The rear seat of claim 13, wherein:
  the operation lever is located below a cushion part of the center seat,
  when the cushion part of the center seat rotates upward, the operation lever is configured to be released from pressing by the cushion part and to rotate by a spring force of the lever spring,
  when the operation lever rotates, the cable is configured to be pulled, the cam bracket, the locking cam, and the locking lever are configured to rotate such that the locking lever, the second link, and the locking tooth are released from locking as the cable is pulled, and
  when the locking lever, the second link, and the locking tooth are released from locking, the center seat is configured to be longitudinally movable with respect to the side seats.

16. A vehicle comprising:
a vehicle body; and
a rear seat mounted in an interior of the vehicle body,
wherein:
- the rear seat comprises a center seat and side seats located on a left side and a right side of the center seat, respectively,
- the center seat comprises a center seat back frame and a center seat cushion frame and is configured to be movable forward and rearward with respect to the side seats so that, when the center seat is moved forward, the center seat protrudes forward from the side seats,
- a back wire is coupled to the center seat back frame of the center seat to protrude rearward,
- a first vehicle body bracket having a concave wire groove is fixed to the vehicle body facing the back wire, and
- the center seat back frame is configured to be rotatable on the back wire inserted in the concave wire groove.

17. The vehicle of claim 16, wherein:
the center seat back frame and the center seat cushion frame are rotatably connected to each other by a first hinge; and
each of the side seats comprises a side seat back frame and a side seat cushion frame that are rotatably connected to each other by a second hinge.

18. A rear seat for a vehicle, the rear seat comprising:
a left side seat;
a right side seat; and
a center seat located between the left side seat and the right side seat,
wherein:
- the center seat is configured to be movable forward and rearward with respect to the left side seat and the right side seat so that when the center seat is moved forward, the center seat protrudes forward from the left side seat and the right side seat,
- a center seat cushion frame of the center seat comprises a wire clip; and
- a side seat cushion frame of each of the left side seat and the right side seat comprises a front wire and a rear wire that are longitudinally spaced apart from each other, the front wire and the rear wire being inserted into the wire clip.

* * * * *